United States Patent Office 2,948,213
Patented Aug. 9, 1960

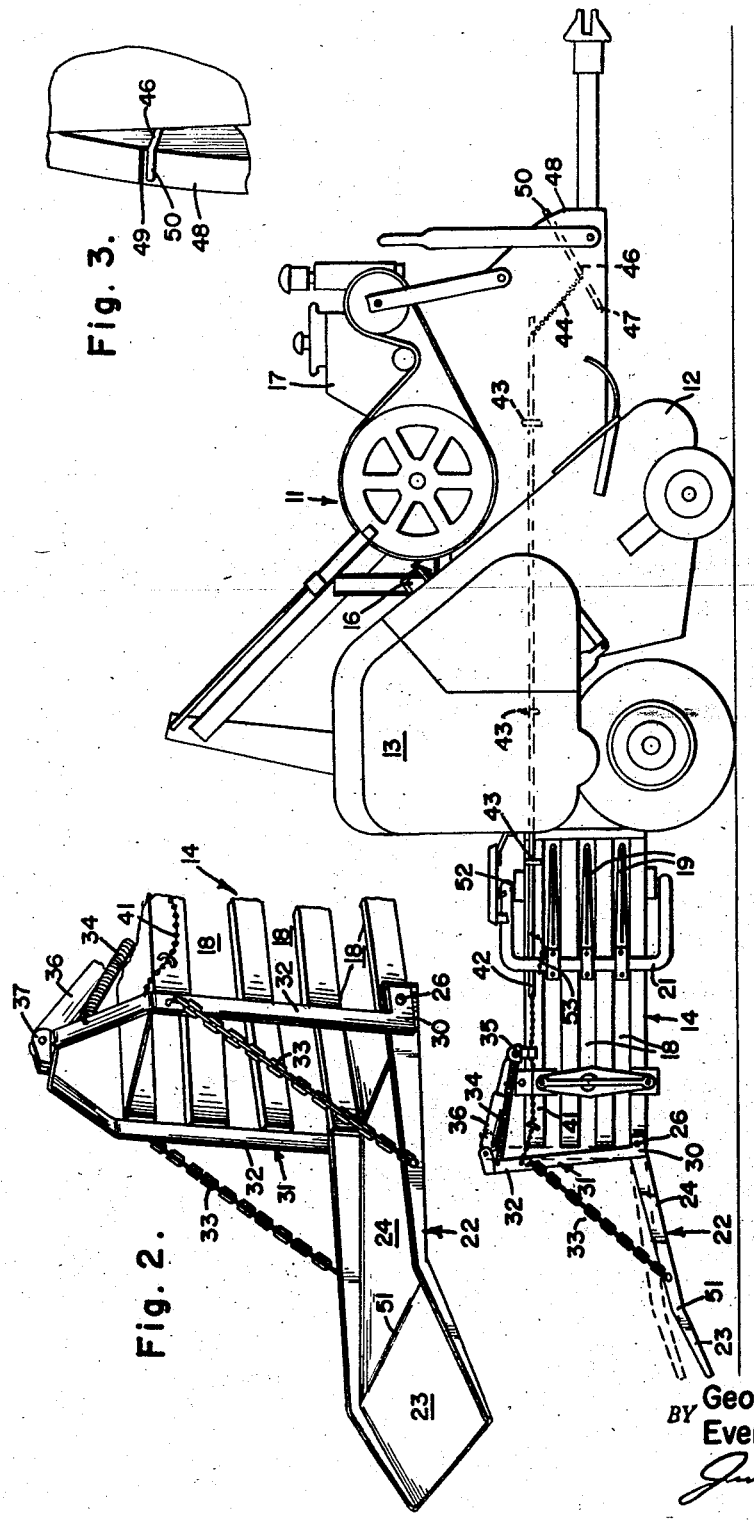

2,948,213

SCALE ATTACHMENT FOR BALERS

George Jay, 602 Merle Lane, and Everett V. Rankins, 904 Trinity St., both of Manteca, Calif.

Filed May 12, 1959, Ser. No. 812,777

9 Claims. (Cl. 100—99)

This invention relates to a new and improved scale attachment for hay baling machines, and the like, wherein the weight of each bale discharged from the baling column is indicated in a position readily visible by the operator of the baling machine.

It will be understood that there are a number of different types of hay baling machines produced by various manufactures and that the details of construction of such machines vary. The portions of the baling machine herein illustrated and described are intended to be merely illustrative of one particular type of baling machine with which the invention may be employed. Such machine is the New Holland, Model No. 98, Wire Tie Baler.

It is desirable that the weight of bales produced in baling machines be kept substantially constant, and hence standard machines have various adjustments which the operator may employ to regulate the weight of the bale produced. In order to operate most effectively, the weight of the bale should be checked frequently so that as conditions change while baling is being performed, the necessary adjustments can be made by the operator without an undue lapse of time. Accordingly, the present invention provides means attached to the baler which weighs each bale and indicates the weight to the operator.

A further feature of the invention is the fact that the indicator is located within the normal vision of the operator, so that it is not necessary to stop the machine in order to observe the weight indication, nor is it necessary for the operator to divert his attention from the normal operation of the machine in order to observe the indicator at the exact time the bale is weighed. On the contrary, the indicator remains stationary at the proper weight for a prolonged period.

An important advantage of the fact that the indicator remains stationary after the bale has been weighed, and until the next bale is ready to be discharged from the baling column, arises from the fact that the operator of a baling machine must ordinarily direct the major portion of his attention to operation of the machine and does not necessarily have the time to observe the position of the indicator at the precise instant when the bale is being weighed. Since the indicator moves up to the full weight of the bale and then remains stationary, the operator may observe the needle at any time which is convenient for him, depending upon operating conditions.

Still another feature of the construction is the fact that the indicator moves from zero weight position to the exact weight of the bale in a continuously upward movement without jerking. It will be understood that as balers move over uneven ground the tendency of the indicator to jerk up and down introduces the possibility of erroneous weight indication. This tendency is overcome by means hereinafter explained in detail.

Another feature of the invention is the fact that the indicator increases in weight as the bale is pushed from the baling column over the tail gate until it reaches a maximum. The construction of the attachment, which is the subject of this invention, is such that when the maximum indication is reached the true weight of the bale has been indicated.

A still further feature of the invention is the fact that there is provided an attachment which may be added to existing balers of various types without major alteration either of the attachment or the baler itself.

A principal feature of the invention is the fact that it saves the time of the operator of the baler, since he does not have to stop to check the weight, and this enables more hay to be baled in a given time period and also saves fuel and wear and tear on the equipment.

By facilitating weighing of the bale, it is possible to eliminate much of the trouble which is encountered in ordinary baling operations in that substantial uniformity of weight is secured. It is understood that heavy bales are likely to cause baling wire breakage or spoilage of the hay, whereas light weight bales are frequently soft and difficult to haul and make poorer stacks. These difficulties are eliminated when the bales are of uniform weight and, accordingly, one of the principal features of the present invention is the fact that it enables the operator to produce uniform bales without inconvenience or waste of time.

A still further feature of the invention is the simplicity and low cost of manufacture and installation. Further, the simplicity makes it unnecessary to service the indicator mechanism, except as incidental to routine service of the baler.

Other objects of the present invention will become apparent upon reading the following specification and referring to the accompanying drawings in which similar characters of reference represent corresponding parts in each of the several views.

In the drawings:

Fig. 1 is a side elevation, partly schematic, of a baler in which the present invention is installed.

Fig. 2 is an enlarged perspective view of a portion of the baler of Fig. 1.

Fig. 3 is a fragmentary perspective view of the baler showing the indicator.

The baling machine 11 to which the attachment of the present invention is applied is subject to wide variation in construction, depending upon the preference of the particular manufacturer. In the particular machine herein illustrated, hay is picked by pickup fingers designated generally by reference numeral 12 and transferred to a hopper 13. From the hopper the hay falls into an opening (not shown) in a horizontally disposed, rearwardly extending baling column 14. Charges of hay are forced into the column by means of a pitman 16 driven by engine 17. The charges are compressed in the column 14 and when a bale of the desired size has been accumulated, baling wires are passed around the bale through horizontally disposed slots 18 in the sides of the column. Needles (not shown) on needle rods 19 affixed to U-shaped crank arm 21 pass through the slots 18 and through the baling column and are tied by means of tying attachments (not shown) on the side of the machine opposite Fig. 1, in a manner well understood in the art. Thereafter, the bale is discharged through the rear end of the column and falls upon a tail gate 22 which extends rearwardly from the rearward end of the column.

In the form of gate shown in the accompanying drawings, the gate has a dog leg shape as viewed in side elevation, in that it has an extreme rearward terminal portion 23 which is disposed at an oblique angle with respect to the nearer portion 24. The gate is pivoted to the column 14 by means of pivots 26 located at the lower rear corners of the column.

In accordance with the present invention, an attachment is added to the machine 11 consisting of an inverted U-shaped frame member 31 having forwardly projecting feet 30 at the lower ends of legs 32 which are received and pivoted by the same pivots 26 which pivot tail gate 22. A chain 33 on either side of the machine interconnects the tail gate 22 and the upper ends of legs 32. Helical coil springs 34 are connected to the upper ends of legs 32 and to brackets 35 disposed on the baler column 14 forwardly of the tail. Thus, when a bale is discharged onto the tail gate 22, it tends to pivot the tail gate downwardly from its initial or dotted line position to the solid line position of Fig. 1, and by reason of the connection of the chains 33 the frame member 31 is likewise pivoted in a counter clockwise direction from the dotted line position to the solid line position shown in Fig. 1, against the force of springs 34. To prevent the frame 31 from bouncing as the baler moves over uneven ground, a conventional automotive shock absorber 36 is interposed between a bracket 37 on the frame member 31 and the baling column. This reduces the tendency of the frame 31 to bounce as the bale bounces on tail gate 22.

On one side of the machine a chain 41 is attached at its rearward end to leg 32, and its forward end is attached to a horizontal longitudinally extending rod 42 which is mounted for horizontal movement parallel to column 14 by guides 43 fastened to the baler. There is sufficient friction between rod 42 and guides 43 so that the rod does not move freely but must be positively moved either forward or rearward with a positive force of definite magnitude. A second chain 44 is attached to the forward end of rod 42 and connects to indicator lever 46 which is pivoted by means of pivot 47 to the forward end of the baler at a position where it is readily observed by the operator of the machine. Lever 46 pivots alongside an arcuate scale 48 concentric with pivot 47 and on which are marked weight indicators 49.

When a bale is discharged from the baling column 14 it is deposited on the tail gate 22 and moves rearwardly on the gate. At the time the bale is deposited, the gate 22 is elevated to dotted line position by reason of springs 34. However, the weight of the bale moves it down to the solid line position and this causes the frame member 31 to pivot from dotted to solid line position and consequently to move rod 42 rearward. Rod 42 tends to move only in a rearward direction, and hence even though the tail gate may bounce up and down as the machine moves over uneven ground (despite the action of shock absorber 36), this bouncing movement does not result in a jerking of the rod 42. As the rod moves rearwardly, the indicator lever 46 pivots upward, and since the rod 42 does not jerk to and fro the indicator moves smoothly without jerking.

It will be noted that the tail gate is angular, and hence when the bale reaches the break edge 51 between portions 23 and 24 of the tail gate maximum leverage on the tail gate is imparted by the weight of the bale, and hence a maximum reading of the indicator is obtained. This maximum indication remains visible at scale 48 for a considerable length of time so that the operator has ample opportunity to observe the reading. Lever 46 is bent in a hook 50 to overhang scale 48 to facilitate reading the scale.

The indicator lever 46 is reset to zero after the bale has been discharged off the rear end of the tail gate by various means such as the means hereinafter described.

It will be understood that the needles (not shown) which pass the baling wire to the column 14 and are mounted on needle rods 19 are actuated by means of U-shaped crankarm 21, which is pivoted by means of vertical pivot 52 on the far side of the machine as viewed in Fig. 1. Arm 21 turns in a counter clockwise direction as viewed from the top when the baling wire is passed through the column. A chain 53 is attached to rod 42 and also to arm 21. As arm 21 pivots in a counter clockwise direction as the needles pass through the baling column, chain 53 pulls rod 42 forwardly and resets the indicator 46 to zero. Inasmuch as arm 21 returns to the position shown in Fig. 1 before the bale is discharged, the movement of chain 53 does not interfere with a true reading of the weight of the bale.

Although the foregoing invention has been described in some detail by way of illustration and example for purposes of clarity of understanding, it is understood that certain changes and modifications may be practiced within the spirit of the invention and scope of the appended claims.

What is claimed is:

1. In a hay baler wherein hay is baled in a column, tied with baling wires and discharged from said column; the improvement which comprises a tailgate adjacent the end of said column onto which each bale of hay is discharged, means pivotally mounting said tailgate on said column, resilient means biasing said tailgate upwardly, a reciprocable rod, means mounting said rod for slidable movement on said baler, flexible means interconnecting said tailgate and said rod whereby downward movement of said tailgate causes rearward movement of said rod, an indicator pivotally mounted proximate the forward end of said bale, means interconnecting said rod and indicator to pivot said indicator in a first direction when said rod is moved rearwardly, and reset means for pivoting said indicator in a second direction opposite said first direction to reset said indicator.

2. In a hay baler wherein hay is baled in a column, tied with baling wires and discharged from said column; the improvement which comprises a tailgate adjacent the end of said column onto which each bale of hay is discharged, a frame member pivotally mounted to said baler, resilient means biasing said frame member to a retracted position, first means interconnecting said tailgate and said frame member to transmit downward movement of said tailgate to said frame member, a reciprocable rod, mounting means mounting said rod for slidable movement on said baler, flexible means interconnecting said frame member and said rod to move said rod longitudinally when said tailgate is depressed, an indicator pivotally mounted proximate the forward end of said baler, means interconnecting said rod and indicator to pivot said indicator in a first direction when said rod is moved rearwardly, and reset means for pivoting said indicator in a second direction opposite said first direction to reset said indicator.

3. In a baler according to claim 2, a wire feeding mechanism having a pivoted arm and in which said reset means comprises a flexible link interconnecting said pivoted arm and said rod.

4. A baler according to claim 2, in which said mounting means engages said rod with a frictional grip to restrain retractive movement of said rod prior to movement of said reset means.

5. A baler according to claim 2, which further comprises a shock absorber interconnecting said frame and said baler.

6. A baler according to claim 2, in which said first means comprises a flexible link whereby motion of said tailgate is transmitted to said frame only in one direction.

7. A baler according to claim 2, in which said indicator is located facing the front end of said baler and which further comprises an arcuate scale disposed proximate the path of movement of said indicator.

8. In a hay baler, a frame, a tailgate located to receive a bale discharged from said baler and pivotally connected thereto, resilient means biasing said tailgate upward, a frame member pivotally mounted on said baler, a first flexible link interconnecting said tailgate and frame member, a rod mounted for reciprocation on said baler and frictionally restrained against free movement on said baler, a second flexible link interconnecting said frame member and said rod, an indicator lever pivotally mounted on said baler, a third flexible link interconnecting said rod and indicator lever, and reset means for returning said indicator lever to zero reading.

9. A baler according to claim 8, in which said baler has movable wire feeding means and in which said reset means is actuated by said wire feeding means.

References Cited in the file of this patent

UNITED STATES PATENTS

| | | |
|---|---|---|
| 370,171 | Wickey | Sept. 20, 1887 |
| 406,455 | Maurer | July 9, 1889 |
| 2,724,324 | Clarke | Nov. 22, 1955 |
| 2,796,825 | Kriegbaum et al. | June 25, 1957 |